US008810640B2

(12) United States Patent
Baba et al.

(10) Patent No.: US 8,810,640 B2
(45) Date of Patent: Aug. 19, 2014

(54) INTRINSIC FEATURE-BASED POSE MEASUREMENT FOR IMAGING MOTION COMPENSATION

(75) Inventors: Justin S. Baba, Knoxville, TN (US); James Samuel Goddard, Jr., Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 353 days.

(21) Appl. No.: 13/108,395

(22) Filed: May 16, 2011

(65) Prior Publication Data

US 2012/0293667 A1 Nov. 22, 2012

(51) Int. Cl.
*H04N 7/01* (2006.01)
*H04N 7/00* (2011.01)

(52) U.S. Cl.
CPC ... *H04N 7/00* (2013.01); *H04N 7/01* (2013.01)
USPC ............................................. 348/68; 382/128

(58) Field of Classification Search
None
See application file for complete search history.

(56) References Cited

U.S. PATENT DOCUMENTS

| | | | |
|---|---|---|---|
| 5,982,352 A | 11/1999 | Pryor | |
| 6,061,468 A | 5/2000 | Kang | |
| 6,473,636 B1 | 10/2002 | Wei et al. | |
| 6,615,063 B1 | 9/2003 | Ntziachristos et al. | |
| 6,919,867 B2 | 7/2005 | Sauer | |
| 6,985,620 B2 * | 1/2006 | Sawhney et al. | 382/154 |
| 6,989,333 B2 * | 1/2006 | Watanabe et al. | 438/725 |
| 7,050,845 B2 | 5/2006 | Vilsmeier | |
| 7,068,825 B2 * | 6/2006 | Rubbert et al. | 382/128 |
| 7,209,579 B1 | 4/2007 | Weisenberger et al. | |
| 7,224,357 B2 | 5/2007 | Chen et al. | |
| 7,310,443 B1 | 12/2007 | Kris et al. | |
| 7,438,685 B2 | 10/2008 | Burdette et al. | |
| 7,463,823 B2 | 12/2008 | Birkenbach et al. | |
| 7,567,697 B2 * | 7/2009 | Mostafavi | 382/131 |
| 7,623,625 B2 * | 11/2009 | Boyden et al. | 378/86 |
| 7,698,094 B2 * | 4/2010 | Aratani et al. | 702/150 |
| 8,334,900 B2 * | 12/2012 | Qu et al. | 348/68 |
| 8,463,006 B2 * | 6/2013 | Prokoski | 382/128 |

(Continued)

OTHER PUBLICATIONS

Baba et al., "Application of Polarization for Optical Motion-Registered SPECT Functional Imaging of Tumors in Mice," Optical Diagnostics and Sensing V. Edited by Priezzhev, Alexandar V.; Cote, Gerard L. Proceedings of the SPIE, vol. 5702, pp. 97-103 (Mar. 2005).

(Continued)

*Primary Examiner* — Jay Patel
*Assistant Examiner* — Reza Aghevli
(74) *Attorney, Agent, or Firm* — Novak Druce Connolly Bove + Quigg LLP

(57) ABSTRACT

Systems and methods for generating motion corrected tomographic images are provided. A method includes obtaining first images of a region of interest (ROI) to be imaged and associated with a first time, where the first images are associated with different positions and orientations with respect to the ROI. The method also includes defining an active region in the each of the first images and selecting intrinsic features in each of the first images based on the active region. Second, identifying a portion of the intrinsic features temporally and spatially matching intrinsic features in corresponding ones of second images of the ROI associated with a second time prior to the first time and computing three-dimensional (3D) coordinates for the portion of the intrinsic features. Finally, the method includes computing a relative pose for the first images based on the 3D coordinates.

20 Claims, 13 Drawing Sheets

(56) References Cited

U.S. PATENT DOCUMENTS

| | | | |
|---|---|---|---|
| 2004/0141635 | A1 | 7/2004 | Liang et al. |
| 2005/0025347 | A1* | 2/2005 | Makram-Ebeid et al. .... 382/128 |
| 2005/0232477 | A1 | 10/2005 | Sugihara et al. |
| 2005/0238198 | A1* | 10/2005 | Brown et al. ............... 382/103 |
| 2010/0149315 | A1 | 6/2010 | Qu et al. |
| 2010/0172567 | A1 | 7/2010 | Prokoski |

OTHER PUBLICATIONS

Gleason et al., "Real-time, high accuracy 3D tracking of small animals for motion-corrected SPECT imaging," Nuclear Science Symposium Conference Record, 2004 IEEE, vol. 5; No., pp. 3338-3342 vol. 5, Oct. 16-22, 2004.

Goddard et al., "Improvements in Intrinsic Feature Pose Measurement for Awake Animal Imaging", Nuclear Science Symposium Conference Record, 2009 IEEE, pp. 2557-2560. Nov. 2010.

Goddard et al., "Intrinsic Feature Pose Measurement for Awake Animal SPECT Imaging", Nuclear Science Symposium conference Record, 2009 IEEE, pp. 2557-2560, Oct. 25-31, 2009.

Goddard et al., "Pose measurement and tracking system for motion-correction of unrestrained small animal PET/SPECT imaging," Nuclear Science Symposium Conference Record, 2003 IEEE, vol. 3, pp. 1824-1827, Oct. 19-25, 2003.

Goddard et al., "Real-time Landmark-Based Unrestrained Animal Tracking System for Motion-Corrected PET/SPECT Imaging", Nuclear Science Symposium Conference Record, 2002 IEEE, vol. 3, pp. 1534-1537, Nov. 10-16, 2002.

Horn, "Closed-form Solution of Absolute Orientation Using Unit Quaternions," 1987, J. Opt. Soc. Am. A., 4(4):629-642.

Kerekes et al., "Two Methods for Tracking Small Animals in SPECT Imaging," Sixth International Conference on Quality Control by Artificial Vision. Edited by Tobin, Kenneth W., Jr.; Meriaudeau, Fabrice. Proceedings of the SPIE, vol. 5132, pp. 129-139 (2003).

Nadella, Multi Camera Stereo and Tracking Patient Motion for SPECT Scanning Systems (Aug. 29, 2005) (MS Thesis, Worcester Polytechnic Institute).

Stoyanov et al., "Soft-Tissue Motion Tracking and Structure Estimation for Robotic Assisted MIS Procedures," Springer Berlin vol. 3imp750 (2005) pp. 139-146.

Tran et al., "Geometry Calibration of a Dual Headed SPECT System, with Rocking Motion Correction, for Small Animal Imaging," Nuclear Science Symposium Conference Record, 2005 IEEE (2005) 4: 2089-2093.

Weisenberger et al., "A Restraint-Free Small Animal SPECT Imaging System with Motion Tracking," 2005, IEEE Transactions on Nuclear Science, vol. 52, No. 3: 638-644 (Jun. 2005).

Weisenberger et al., "A Small-Animal SPECT Imaging System Utilizing Position Tracking of Unanesthetized Mice," Springer US, (2005) pp. 239-243.

Weisenberger et al., "Development and testing of a restraint free small animal SPECT imaging system with infrared based motion tracking," Nuclear Science Symposium Conference Record, 2003 IEEE, vol. 3.

Weisenberger et al., "Dual Low Profile Detector Heads for a Restraint Free Small Animal SPECT Imaging System," Nuclear Science Symposium Conference Record, 2004 IEEE Publication, vol. 4, 16-22, pp. 2456-2460 (Oct. 2004).

Weisenberger et al., "Instrumentation Development of a SPECT-CT System to Image Awake Mice," 1987, Opt. Soc. Am. A., 4(4):629-642.

\* cited by examiner

100

300

300

400 ated with a first time and with different positions and orientations with respect to the ROI. The system further includes additional modules for causing the processor to process each one of the first plurality of images. The processing includes defining an active region in the plurality of images and selecting intrinsic features in the first plurality of images based on the active region. The processing also includes identifying a portion of the intrinsic features temporally and spatially matching intrinsic features in a corresponding one of a second plurality of images of the ROI associated with a second time prior to the first time. The system further includes another module for causing the processor to compute pose information for the first plurality of images based on the portion of the intrinsic features.

INTRINSIC FEATURE-BASED POSE MEASUREMENT FOR IMAGING MOTION COMPENSATION

STATEMENT REGARDING FEDERALLY SPONSORED RESEARCH

This invention was made with Government support under Contract No. DE-AC05-00OR22725 awarded by The Department of Energy. The government has certain rights in the invention.

FIELD OF THE INVENTION

The present invention relates to motion correction for imaging technologies, and more specifically to systems and method for obtaining pose measurements for use in motion correction for imaging technologies.

BACKGROUND

Several methods for high-resolution single photon emission computed tomography (SPECT) instrumentation to image awake, un-anesthetized small animals are currently available. As a result, functional imaging studies can now be performed on animals without anesthetics or significant restraints which could alter the results. The technology can be extended directly to clinical applications on human patients unable to remain still (e.g. Parkinson's patients, Alzheimer's patients, small children, etc.) during a scan.

In general, such methods rely on an optical measurement and motion tracking system that provides 3D position and orientation (pose) of a subject during the SPECT imaging scan. Typically, most methods rely on the use of external markers for motion tracking and pose calculation. While this approach has been proven to be accurate, the additional handling required to attach the markers is undesirable, particularly in animals. Further, markers and other similar devices can also be uncomfortable and can lead to additional motion of a subject with possible complete dislodgement of a marker/markers during the course of the scan.

SUMMARY

Embodiments of the invention concern systems and method generating pose information for motion correction of images. In a first embodiment of the invention, a method for generating pose information for motion correction images is provided. The method includes obtaining a first plurality of images of a region of interest (ROI) to be imaged and associated with a first time, the first plurality of images associated with different positions and orientations with respect to the ROI. The method also includes processing the first plurality of images. The processing includes defining an active region in the one of the first plurality of images and selecting intrinsic features in the one of the first plurality of images based on the active region. The processing also includes identifying a portion of the intrinsic features temporally and spatially matching intrinsic features in a corresponding one of a second plurality of images of the ROI associated with a second time prior to the first time. Finally, the method includes computing pose information for the first plurality of images based on the portion of the intrinsic features.

In a second embodiment of the invention, a system for generating pose information for motion correction of images is provided. The system includes a processor. The system also includes a module configured for causing the processor to obtain a first plurality of images of a ROI to be imaged, where the first plurality of images are associated with a first time and different positions and orientations with respect to the ROI. The system further includes additional modules for causing the processor to process each one of the first plurality of images. The processing includes defining an active region in the plurality of images and selecting intrinsic features in the first plurality of images based on the active region. The processing also includes identifying a portion of the intrinsic features temporally and spatially matching intrinsic features in a corresponding one of a second plurality of images of the ROI associated with a second time prior to the first time. The system further includes another module for causing the processor to compute pose information for the first plurality of images based on the portion of the intrinsic features.

In a third embodiment of the invention, a computer-readable medium is provided, storing a computer program having instructions for generating pose information for motion correction of images. The instructions include obtaining a first plurality of images of a ROI to be imaged, where the first plurality of images are associated with a first time and with different positions and orientations with respect to the ROI. The instructions further include processing each one of the first plurality of images. The processing includes defining an active region in the one of the first plurality of images and selecting intrinsic features in the one of the first plurality of images based on the active region. The processing also includes identifying a portion of the intrinsic features temporally and spatially matching intrinsic features in a corresponding one of a second plurality of images of the ROI associated with a second time prior to the first time and computing 3D coordinates for the portion of the intrinsic features. The instructions additionally include computing pose information for the first plurality of images based on the 3D coordinates.

DETAILED DESCRIPTION

Figure 1:
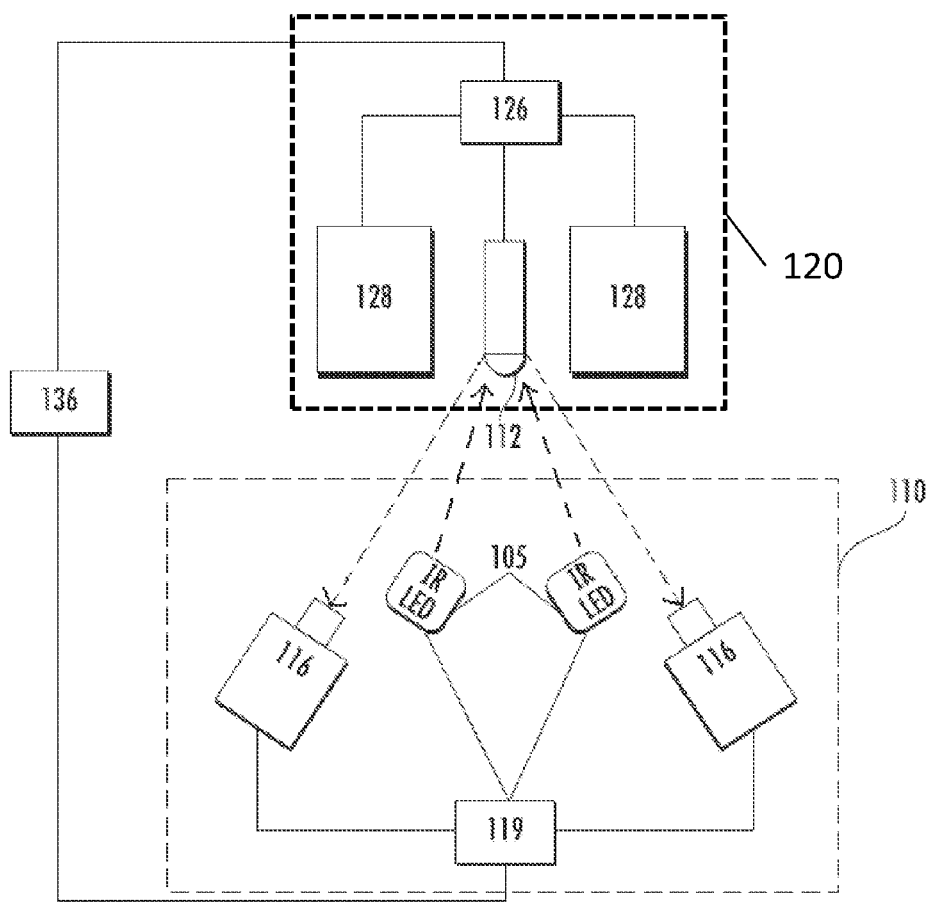
FIG. 1. is a schematic illustrating an exemplary configuration for an imaging system in accordance with the various embodiments.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As noted above, many motion tracking and correction technologies rely on the use of markers attached to a subject. However the use of markers requires additional handling of the subjects. Further, data may be lost if the markers become detached or shift or if the markers cannot be properly discerned during imaging. Additionally, even in motion tracking and correction technologies that do not rely on the use of markers but that rely on features in the images, the motion tracking and correction is often hampered by the detection of features unrelated to the subject being imaged or by problems regarding how to merge information from various sources.

In view of the limitations of such conventional methods, the various embodiments of the invention provide systems and methods for improved motion tracking without the need for such markers. In particular, the various embodiments provide an intrinsic feature pose calculation method for tracking that extracts discrete, natural features of the subject with sufficient structure for matching from optical two-dimensional (2D) stereo images. These features are first tracked in time through the 2D image sequence. Then, stereo correspondence of tracked features for a camera pair is performed in order to determine three-dimensional (3D) locations. As used herein, the term "pair" refers to two or more. The change in 3D position of these features from frame to frame is thereafter fit to a rigid body transformation using a robust statistical method. This transformation then determines the change in pose over time.

Motion Tracking System

FIG. 1 shows an exemplary imaging system 100 configured in accordance with the various embodiments. The exemplary imaging system 100 includes a support 112 (e.g., a platform or a burrow) for locating a subject, an optical imaging system 110 for optically tracking motion of a subject in the support 112, a tomography system 120 for generating diagnostic images of the subject in the support 112, and a tracking/processing system 136 for controlling and coordinating operation of the various components in FIG. 1.

For ease of illustration, the various embodiments will be described with respect to a single photon emission computed tomography (SPECT) scanner for performing awake animal imaging while compensating for motion of the subject during the scan. SPECT is one of several nuclear imaging techniques. Generally, in nuclear imaging, a radioactive isotope is injected into, inhaled by or ingested by a subject, such as a patient or other subject. The isotope, provided as a radioactive-labeled pharmaceutical (radio-pharmaceutical) is chosen based on bio-kinetic properties that cause preferential uptake by different tissues. The gamma photons emitted by the radio-pharmaceutical are detected by radiation detectors outside the body, giving the spatial and uptake distribution of the radio-pharmaceutical within the body while minimizing trauma to the subject.

Although described relative to SPECT, the systems and methods described herein are in no way limited to SPECT. For example, the various embodiments are applicable to other tomography methods, such as computed tomography (CT), or positron emission tomography (PET). The various embodiments are applicable also applicable to non-tomography-based scanned imaging, such as MRI or ultrasound. More generally, any application generally requiring 3D motion tracking of a living subject for positioning and correction can benefit from the invention.

The tomography system 120 includes a motion control computer system 126 which includes memory and a processor. Where necessary, motion control computer system 126 can control the relative motion of the support 112 and detectors 128 in conjunction with a suitable gantry structure for rotating mouse support 112 (not shown). In some embodiments, sufficient detectors 128 may be present that rotation is not necessary, while in others, a plurality of detectors will be used in order to reduce the necessary angle of rotation and expedite acquisition of the SPECT data.

The radiation detectors 128 can also include a specially designed collimator to acquire data from different projection views. The tracking/processing system 136 can receive the motion data comprising 3D position and orientation of the subject in the support 112 relative to an initial reference position from PC 119, and correct the radiation data received from the radiation detectors 128 for motion of the subject.

As shown in FIG. 1, the optical imaging system 110 uses optical imaging to view a subject located on or in support 112 located between gamma detector heads 128. Accordingly, at least a portion of the support 112 should be optically transparent to allow the region of interest to remain visible to the cameras 116. In the exemplary embodiment of FIG. 1, multiple cameras 116 along with infrared (IR) light sources 105 illuminate and provide multiple views of the region of interest of a subject. The lights 105 are synchronized via a light control system 119 and pulsed to freeze motion while minimizing reflections. The multiple camera image acquisition system acquires raw images (i.e., unprocessed) of the subject through a range of motions accommodated by the support 112 via motion control system 126. Although only two cameras are illustrated in FIG. 1, additional cameras can be used to further improve tracking. The camera redundancy significantly reduces loss of tracking since a 3D measurement can be calculated when a feature is visible in at least two cameras.

In one exemplary configuration, three cameras 116 are mounted facing the front of the support 112 containing the subject. The cameras 116 are raised above the centerline of the support 112 and angled to look down on top of the region of interest of the subject. In this configuration, the IR light sources 105 can be configured as LED ring lights mounted around a lens of each of the cameras 116. However, ring lights are not required in the various embodiments. Rather, any arrangement of lights can be used, provided that they are arranged to sufficiently illuminate the region of interest of the subject.

In the various embodiments, the support 112 can be configured in various ways. For example, support 112 can be a burrow, tube, or other type of enclosed spaced in which a subject can be positioned. Alternatively, support 112 can be a platform, shelf, or other type of non-enclosed support structure on which a subject can be positioned. In some configurations, the support 112 can also include one or more restraint devices for at least partially restraining the subject on or in the support 112.

Although the various embodiments will generally be described with respect to an IR light source, other types of light sources can be used as well, including visible light sources. However, non-visible light sources have the additional advantage of not inducing additional motion or physiologic perturbation of the subject when pulsing of the light source is used. For example, in the case of animals, pulsing of the light source can startle the animal, causing additional motion of the animal and thus greater measurement errors. However, such difficulties can be overcome by using a continuous light source and controlling exposure times and lengths within the camera to freeze motion of the subject.

Additionally, to reduce error due to ambient light sources, optical filters can be provided for the cameras 116. That is, the filters can be configured to allow light corresponding to the light sources 105 to pass, while blocking other types of light.

As described above, the overall operation of system 100 can be controlled via a tracking computer 136. Measurement software on the tracking computer performs image acquisition, feature segmentation, reflection rejection, stereo correspondence, 3D measurement, and pose calculation. The pose information is also time stamped as is the detector system event data so that list mode SPECT data can be motion compensated as part of reconstruction during or after the scan is complete. Additionally the tracking computer can employ one or more graphics processing unit (GPU), field programmable gate array (FPGA) or the like to accelerate this process, i.e. acquisition, analysis and computation of the tracking parameters.

Intrinsic Feature Pose Calculation

Figure 2:
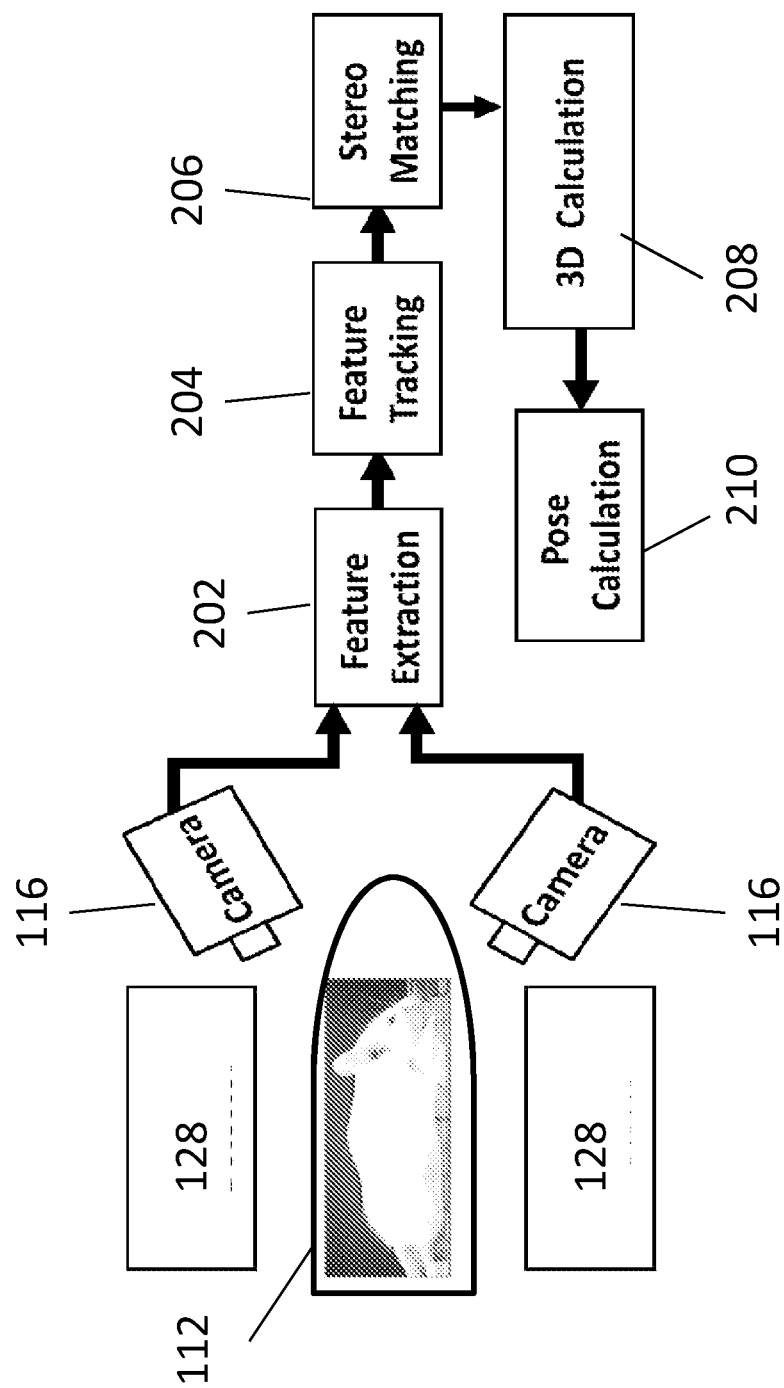
FIG. 2 is a block diagram of schematically illustrating an intrinsic feature and extraction process in accordance with the various embodiments.

An intrinsic feature extraction process is schematically illustrated in the block diagram of FIG. 2. Images of the subject in the support 112 between detectors 128 are obtained from the cameras 116. These images are first rectified to reduce the correspondence search time since all epipolar lines are horizontal after rectification. An epipolar line is the projection in one camera of the line from the optical center of the other camera to a point in the scene. For the rectified images, the projection of the optical center from the other camera is at infinity so all epipolar lines are horizontal. Next, the portion of the subject imaged by the cameras 116 is segmented from the background portion of the image including the support 112 (Block 202). This has the benefit of removing reflections of the movement of the subject from the glass tube that could potentially cause false matching. From the segmented portion, significant features are extracted and tracked from the same camera with sequential images (Block 204). For example, the features can be extracted and tracked using a Lucas-Kanade optical flow. Correspondence of features between stereo images is performed next using normalized correlation with filtering to ignore reflections and extraneous points (Block 206). From these matches, optimal triangulation is used for accurate 3D position calculation. (208) Each matched set is given by $$\begin{bmatrix} x \\ y \\ d \end{bmatrix} = \begin{bmatrix} x_R \\ \frac{(y_R - y_L)}{2} \\ x_R - x_L \end{bmatrix}, \quad (1)$$

where $x_R$, $y_R$, $x_L$, $y_L$ are the image coordinates of the right and left camera, respectively, and d is the image disparity. The 3D coordinates are then found from $$\begin{bmatrix} X \\ Y \\ Z \\ W \end{bmatrix} = \begin{bmatrix} 1 & 0 & 0 & -c_x \\ 0 & 1 & 0 & -c_y \\ 0 & 0 & 0 & f \\ 0 & 0 & -\frac{1}{T_x} & \frac{(c_x - c'_x)}{T_x} \end{bmatrix} \begin{bmatrix} x \\ y \\ d \\ 1 \end{bmatrix} \quad (2)$$

where $c_x$ and $c_y$ are the optical center coordinates of the right camera and $c'_x$ is the optical center x-coordinate of the left camera. $T_x$ is the x-axis separation distance between cameras and f is the focal length which is the same for both cameras. Dividing homogeneous coordinates X, Y, Z through by W gives the absolute 3D coordinates.

Tracking the 3D features over time using robust statistical methods enables the determination and fit to a rigid body model of the region of interest of the subject being imaged. Accordingly, pose change can be calculated as the 3D translation and rotation needed to align the current measurement relative to the model (Block 210).

Figure 3A:
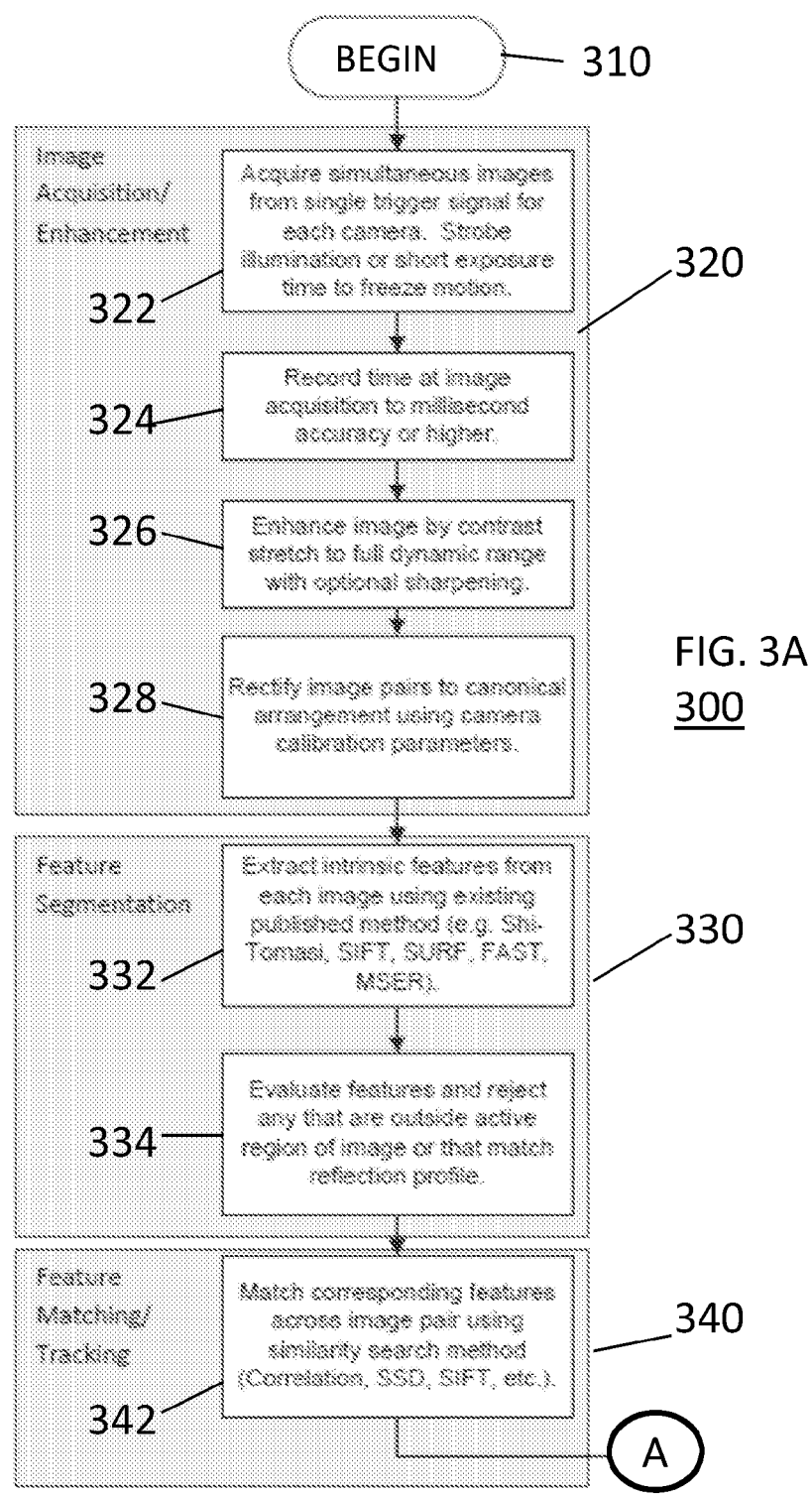
FIGS. 3A and 3B show a flow-chart of an exemplary method for feature extraction and tracking in accordance with the various embodiments.
Figure 3B:
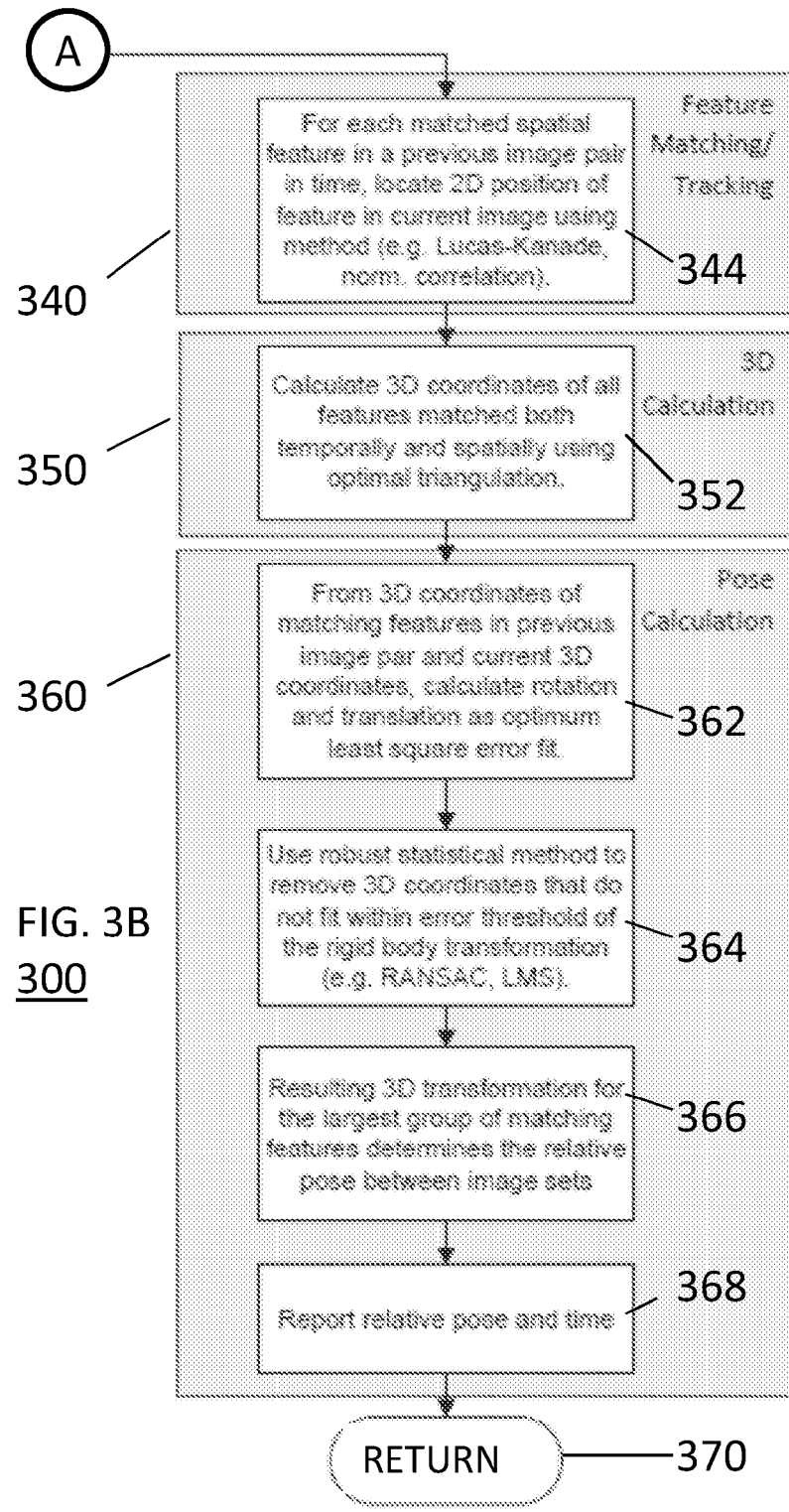

FIGS. 3A and 3B show a flow chart of a method 300 in accordance with the process illustrated in FIG. 2 and providing additional details. The method 300 begins at block 310 and continues on to block 320. At block 320, image acquisition and enhancement is first performed. Block 320 includes first acquiring simultaneous images from each camera (raw images) based on a single trigger signal at step 322. At step 322, strobe or pulse illumination or short exposure times are used to freeze motion of the subject. Concurrently with step 322, the time of image acquisition is recorded at step 324. In the various embodiments the accuracy can vary. Thus, the acquisition rate can be adjusted to match that of the imaging. In one exemplary embodiment, a millisecond accuracy can be used with SPECT imaging. After the image acquisition at step 322, the raw images can be enhanced at step 326 to facilitate analysis. For example, as shown in FIGS. 3A and 3B, this can involve stretching contrast to a full dynamic range. Additionally, sharpening of the raw images can also be performed. Further, step 326 can also include performing any other types of image enhancement or adjustment of any other image attributes. For example, such additional image enhancements can include adjustment of brightness to obtain maximum contrast within the image region containing the subject, histogram equalization, histogram specification, and gamma adjustment, to name a few. Following step 326, rectification of the image pairs can be performed at step 328. In particular, the image pairs can be rectified to a canonical arrangement using camera calibration parameters.

The term "rectified" is commonly used in stereo imaging and refers to a transformation of a pair of stereo images to a canonical arrangement where image axes are aligned and are within the same plane. In one embodiment, a "C" callable software library function in the open source library, OpenCV, can be used to perform the rectification. Camera and stereo calibration parameters are supplied as input. Once rectified, in this case, the horizontal x-axes are aligned so that a feature in one image, with coordinates $(x_1, y_1)$ will have coordinates $(x_2, y_1)$ in the other image. This common y coordinate means that to search for a corresponding feature in the other image, only the line with the same y coordinate needs to be searched and not the entire image. This greatly reduces the correspondence search time. Alternatively, the y-axes can be aligned during rectification so that a feature in one image, with coordinates $(x_1, y_1)$ will have coordinates $(x_1, y_2)$ in the other image. This common x coordinate means that to search for a corresponding feature in the other image, only the line with the same x coordinate needs to be searched and not the entire image.

An additional reduction in search can be provided in the various embodiments by the use of feature tracking over time. That is, say the x coordinate of the feature was $x_1$ in the previous image. Thus, an assumption is made that even with motion, the feature cannot move more than d pixels. Therefore, the search is restricted to the range $[x_1-d, x_2+d]$. Optionally, the motion is calculated and tracked so that the variable d can vary over time as the motion changes.

Once the image acquisition and enhancement is performed at block 320, the method can continue to block 330 to perform the feature segmentation process. The feature segmentation process can begin at step 332 by extracting intrinsic features from each image. As used herein, the term "intrinsic feature" refers to any small region or point within an image and located on the subject being tracked. Generally such a feature is a natural or permanent part of the subject, such as eyes, nose, and mouth, mouth that has distinguishing characteristics which can be extracted with image analysis. The intrinsic features can be extracted using any available methods, including Shi-Tomasi, CenSurE keypoint detection, SIFT, SURF, FAST, and MSER region methods, to name a few. Once the intrinsic features are extracted at step 332, the features can be evaluated at step 334 to reject undesirable features. For example, filtering can be applied to the images by locating an active area within the image that contains only the region of interest of the subject. Feature points outside this region are then excluded. Reflections are also excluded since these are from light reflection off the transparent support and do not move. Additionally, these reflections have a characteristic shape unlike features so they can be detected and ignored. Further details regarding the segmentation process are described below.

In the various embodiments, a spatial criteria can be specified for the points or features to be matched. For example, a minimum of three points or features can be required to be matched between image frames to calculate a transformation. Further, such points should not be collinear and should preferably also not be evenly spaced apart. In other words, the points should be selected in the images such that three points form a scalene triangle. Alternatively stated, it is preferable to avoid selection of points forming an equilateral or isosceles triangle. More than three is desirable as an optimized fit can be calculated to reduce errors and can produce reliable pose measurements. In some embodiments, spatial criteria can be applied to matched feature points in order to compute the position and orientation reliably and accurately.

In the various embodiments, various methods for selecting these points can be provided. For example, in one embodiment, each set of three points can be tested to ensure that the points are not collinear. One method of calculating whether three points (vectors $p_1$, $p_2$, and $p_3$) are collinear is to compute the cross product of $p_2-p_1$, and $p_3-p_1$. The magnitude of the resulting value is compared to a threshold. If the value is less than the threshold, the points are considered collinear and other points need to be selected. With respect to spacing, a spacing requirement is provided to ensure that the points are sufficiently separated to ensure an accurate measurement. For example, the squared distance between each of the points can calculated and compared to a threshold. If the squared distance is less than the threshold, then the points are not sufficiently separated and other points need to be selected.

After the feature set is selected using the feature segmentation process at block 330, the method can continue to block 340 to perform feature matching and tracking. In particular, at step 340, corresponding features can be matched across the image pair using a similarity search method. For example, normalized correlation, and SIFT similarity search methods, sum of square difference methods (SSD), and census transform methods can be used, to name a few. Once corresponding features are matched at step 342, the position of matched features in image pairs can be tracked over time at step 344. That is, for each matched feature in a previous image pair in time, the location of the feature in a subsequent or current image pair in time is determined. Such tracking can be performed using various methods, including Lucas-Kanade, normalized correlation methods, SIFT matching, and SURF matching methods, to name a few. Further details regarding the tracking process are described below.

Following the feature tracking and matching at block 350, a calculation of the 3D coordinates of the feature can be obtained. In particular, the 3D coordinates can be obtained for features that are matched temporally and spatially using an optimal triangulation method at step 352. The optimal triangulation method is applied to the rectified matched coordinates from a stereo image pair. In theory, the rectified y coordinates for the matched points should be identical. Practically, due to unavoidable calibration and matching errors, these coordinates will not be the same. Therefore, in some embodiments, the difference between the y coordinates can be first calculated. If this distance is greater than a threshold t, then the point is considered a mismatch and is not processed. Otherwise the y coordinate is calculated as $y=\frac{1}{2}(y_1+y_2)$.

Finally, once the 3D coordinates are obtained at block 350, pose calculations can be performed at block 360. First, at step 362, the 3D coordinates from a previous and current image pair in time are used to calculate rotation and translation. That is, providing a fit to a local rigid body model of the region of interest of the subject between consecutive images using robust statistical methods to eliminate mismatched features and noise. This can be performed using a least square error technique or a scale error technique. However, any other fitting techniques, linear and non-linear, can also be used in the various embodiments. For example, such techniques can include simulated annealing, minimum absolute error, and weighted least square error techniques, to name a few. Thereafter, a robust statistical method can be used in step 364 to remove 3D coordinates which do not fit within an error threshold of the rigid body transformation of step 362. That is, using only those points that appear to be located on the same rigid body undergoing motion. For example, random sample and consensus (RANSAC) and least median square (LMS) methods, to name a few, can be used in step 364 to identify these points. Following step 364, the relative pose between subsequent image pairs in time can be determined at step 366 based on the resulting 3D transformation for the largest group of matching features. Therefore, the pose information can be reported at step 368. Following block 360, the method 300 can go to block 370 and resume previous processing, including repeating of method 300.

It is worth noting that tracking feature points only through two sequential images can lead to error growth as the difference in motion is calculated only with respect to the previous image. Over time, small transformation errors can accumulate resulting in incorrect tracking. Accordingly, in some embodiments of the invention, error growth can be reset as normal measurements are made from frame to frame. Several approaches are possible including tracking across multiple frames, detecting position loops and synchronizing to them, and tracking to reference frames periodically over time. Additionally, morphing the time point images into a standardized original image frame (such as a quality image with the subject still), can help increase correspondence for motion (primarily in the z direction or depth/axial dimension). This can help account for magnification differences due to motion and geometry changes as well.

A. Calibration

Figure 4:
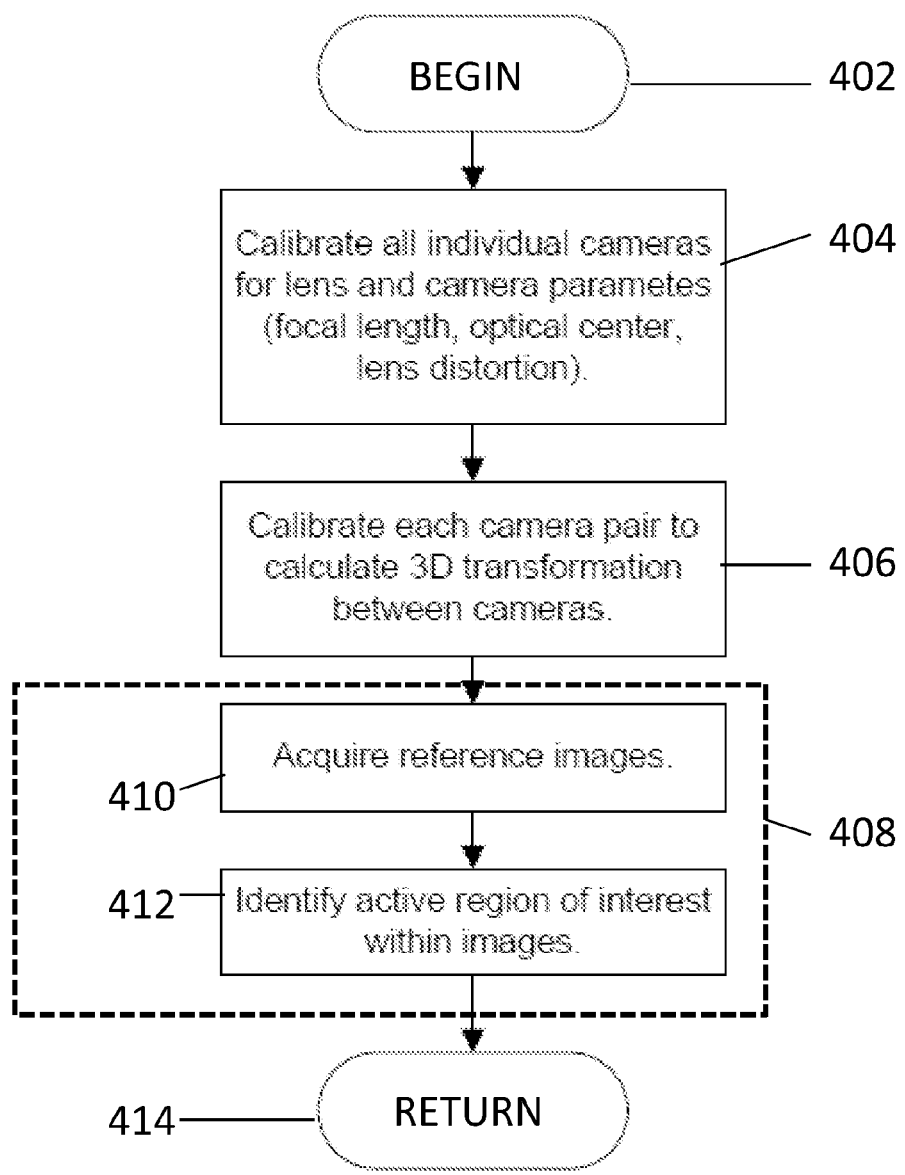
FIG. 4 is a flow chart of an exemplary method for camera calibration in accordance with the various embodiments.

In the various embodiments, each camera is initially calibrated offline to determine both intrinsic (lens focal length, camera center, and distortion) and extrinsic calibration parameters for each camera and between pairs of cameras. The calibration procedure will be described with respect to FIG. 4. FIG. 4 is a flow chart of steps in a method 400 for calibration in accordance with the various embodiments. The method 400 begins at step 402 and continues to step 404. At step 404, each of the cameras is calibrated. That is, each camera is calibrated for lens and camera parameters, such as focal length, optical center, and lens distortion, to name a few. Thereafter, at step 406, camera pairs are calibrated in order to determine the 3D transformation between the cameras.

As noted above, the calibration procedure combines both calibration steps in calculating the intrinsic and extrinsic parameters of a camera and lens model. The extrinsic parameters determine the 3D position and orientation of the cameras with respect to a common reference frame. Accordingly, at step 408, the extrinsic parameters can be obtained by first performing step 410 to acquire reference images. That is, a sequence of images, such as those of a checkerboard calibration pattern, is taken simultaneously from all cameras while the pattern is moved to different positions and orientations between images. Thereafter, the active region of interest within the reference images is identified at step 412 to extract the extrinsic parameters. For example, checkerboard corners can be automatically extracted followed by a nonlinear optimization for both intrinsic and extrinsic parameters to obtain the minimum least square error fit to the model. Typical calibration errors as measured by the difference between actual and projected 2D image point corner locations are less than 0.25 pixel RMS.

From the intrinsic and extrinsic calibration parameters, an image rectification transform can be obtained to perform a rectification that aligns each of the images such that both lie in the same plane, have the same focal length, and have the same orientation. Since these are horizontally separated cameras, the vertical offset is the same as well. This results in a significantly reduced search time for matches since a feature in one image has to appear in the same horizontal line of the other image.

B. Segmentation and Tracking

Figure 5B:
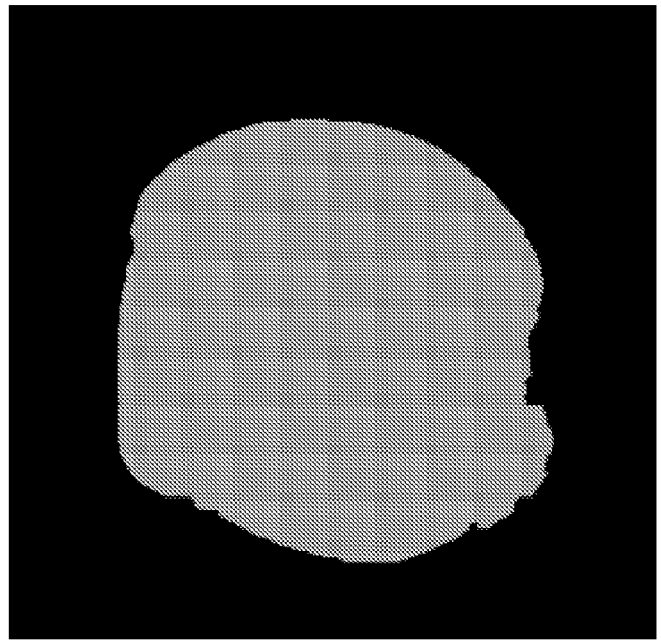
FIG. 5B is a mask generated from the active region outline of FIG. 5A in accordance with the various embodiments.
Figure 5A:
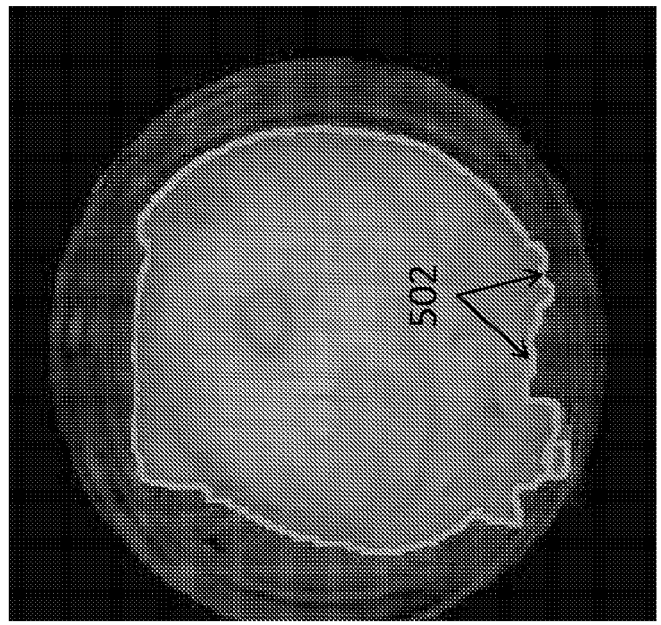
FIG. 5A is an acquired image of a mouse in a support after rectification and showing an outline for active region of an image in accordance with the various embodiments.
Figure 6:
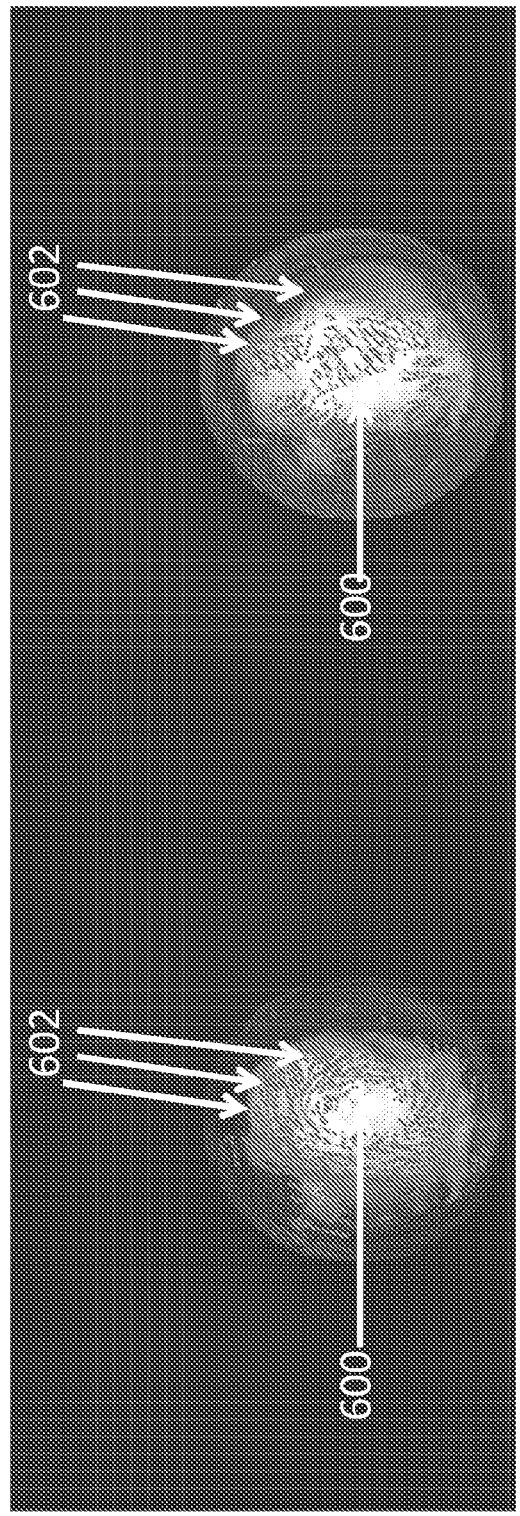
FIG. 6 shows left and right stereo image pair with feature tracks obtained in accordance with the various embodiments.

Prior to the feature extraction/segmentation described above with respect to FIG. 3, segmentation of the subject from the rectified image can be first performed. For example, FIG. 5A shows an acquired image of a mouse in a support. Automatic thresholding can be used to discern the head of mouse from other parts of the image to define an active area and generate an outline 502. Thereafter, a mask for selecting features can be generated using the outline, as shown in FIG. 5B. Point features can then be extracted and tracked over time within the image sequence to identify features for each image pair that show the projected 2D image movement between consecutive images. For example, the live mouse images as shown in FIG. 6 give the tracks 602 for two consecutive stereo pairs images of a mouse 600. Tracks 602 are determined independently for each camera image without regard to the matching stereo pair. The features shown in FIG. 6 were extracted using the Shi-Tomasi method and tracked with a Lucase-Kanade optical flow.

C. Stereo Correspondence

Figure 7:
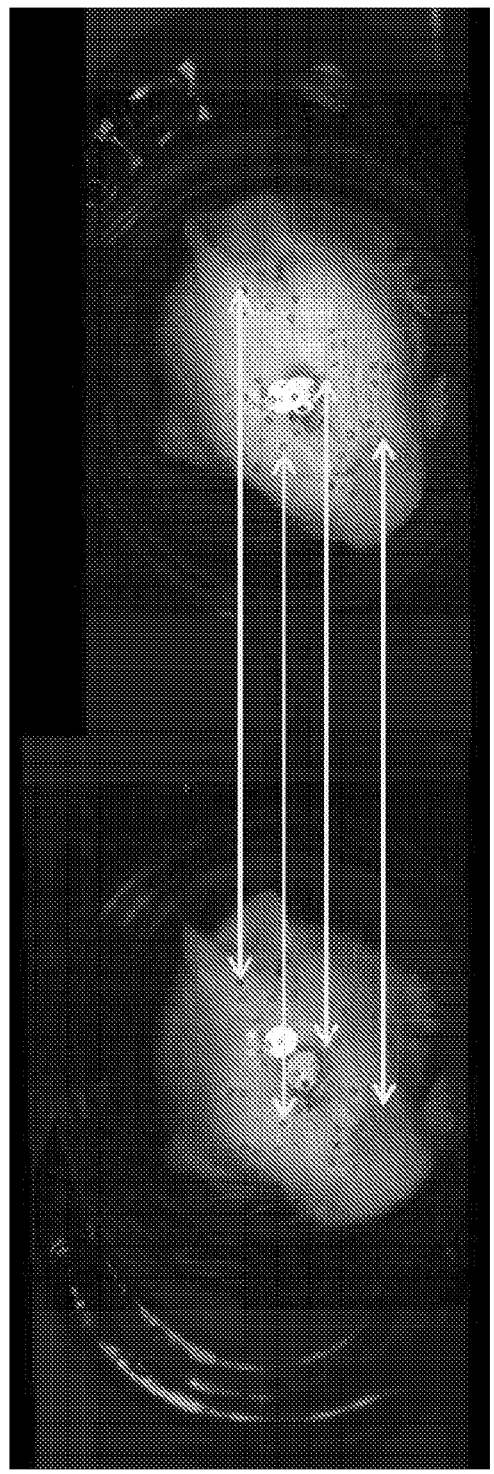
FIG. 7 shows a left and right stereo image pair with intrinsic matching point found using normalized correlation in accordance with the various embodiments.

Correspondence of features between stereo image pairs is performed next along with filtering to remove reflections and extraneous points not located in the ROI, e.g., on the head. This stereo correspondence uses normalized correlation to match windowed regions around each feature with the corresponding region in the stereo image. This method enables corresponding point locations to be determined to sub-pixel accuracy. Prior rectification of the images ensures that epipolar lines are horizontal with the result that matching features have nearly the same y-coordinates. The differences in the x-coordinate define the disparity corresponding to range or depth from the reference image. FIG. 7 shows a rectified stereo image pair with matched points determined using normalized correlation. Example matching points are shown connected by horizontal lines. The result of this step is a set of matched (x, y) 2D image points from the left and right images that are also tracked from image to image.

D. Pose Calculation

Figure 8:
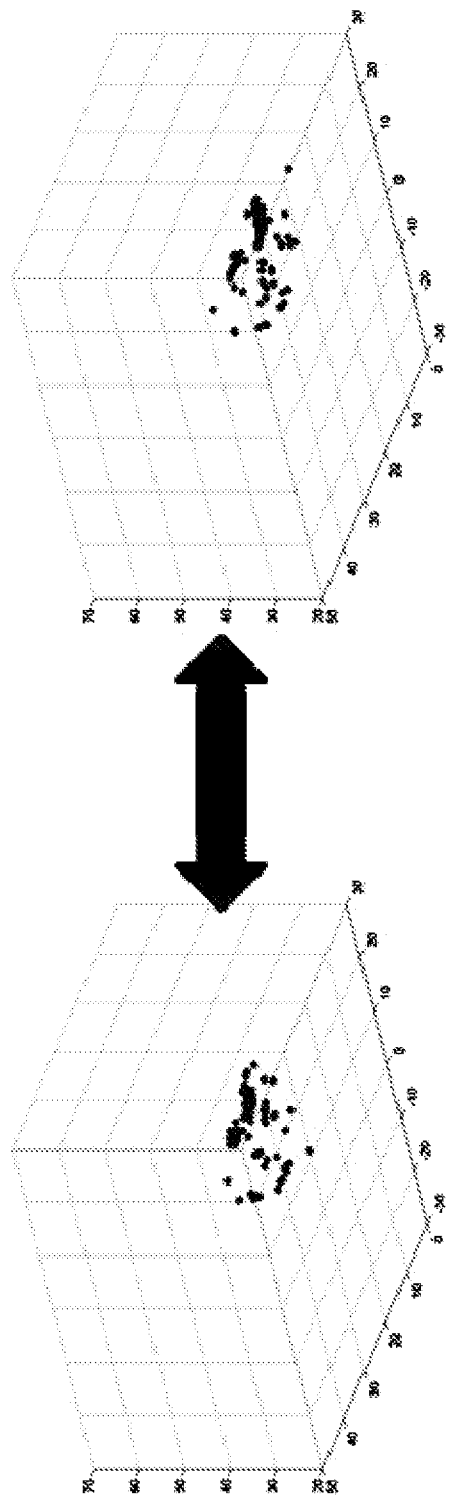
FIG. 8 shows 3D measurement plots for corresponding features of a mouse head from consecutive live mouse stereo image pairs one of which is shown in FIG. 7 and obtained in accordance with the various embodiments.
Figure 9:
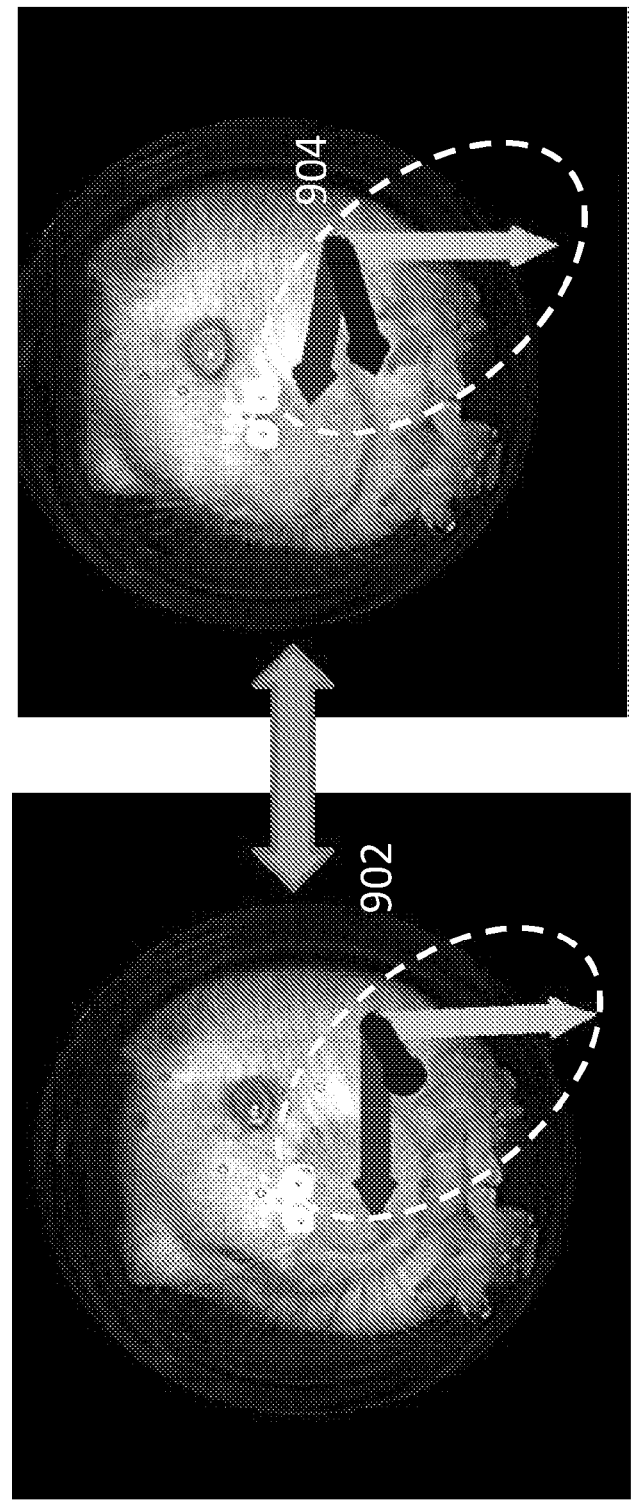
FIG. 9 shows the pose measurement for each of two consecutive images obtained in accordance with the various embodiments.

From equations 1 and 2, the calculated 3D points for a set of two consecutive live mouse stereo images are shown in FIG. 8. FIG. 8 shows x-y-z plots of the points for two image pairs that are matched and tracked in time, one of which is shown in FIG. 7. The 3D features are fit to the rigid body head model from each 3D point set. The 3D translation and rotation needed to align the current measurement relative to this rigid body model is calculated. Further, any points not fitting the rigid body model are removed. Tracking of points through sequential images provides continuity in the pose measurement. FIG. 9 illustrates the pose calculation and change in orientation from one image to the next. In FIG. 9, the pose in each image is represented by arrow sets 902 and 904, showing the directions of the x-, y-, and z-axes relative to an initial pose. The change in pose can be calculated as translations for each axis and as rotations for each axis. From two sets of 3D points the rotation and translation can calculated using Horn's method or other techniques. This method is applicable to three or more point sets. The advantage of using Horn's method is that it calculates the least squared error transformation in a closed form as opposed to an iterative solution. This reduces processing time significantly as needed for real-time applications.

Live Mouse Results

Figure 10:
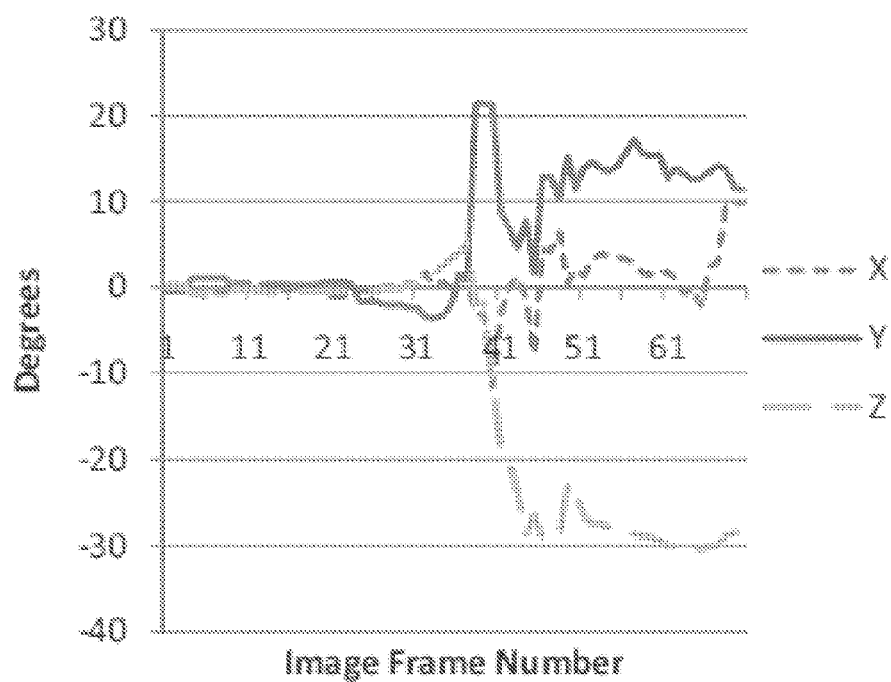
FIG. 10 shows an x-y plot of cumulative rotation versus image number for pose measurements obtained in accordance with the various embodiments.

Live mouse image sets were obtained on the SPECT system shown in FIG. 1. Software was implemented to calibrate and rectify image pairs along with segmentation and feature tracking to determine 3D locations relative to a fixed reference frame. Pose differences between consecutive images were calculated for a 70 frame sequence. The maximum translation for this sequence of images was 10, 22, −31 degrees respectively along the x, y, and z axes. Cumulative rotation about each axis is given in FIG. 10. Each differential rotation is added to the previous value to obtain the resulting plots. Further, FIG. 10 shows the range of orientation motion encountered during the scan. Thus, FIG. 10 shows the ability of a method in accordance with the various embodiments to compute relatively smooth cumulative measurements from the differential rotations.

Figure 11:
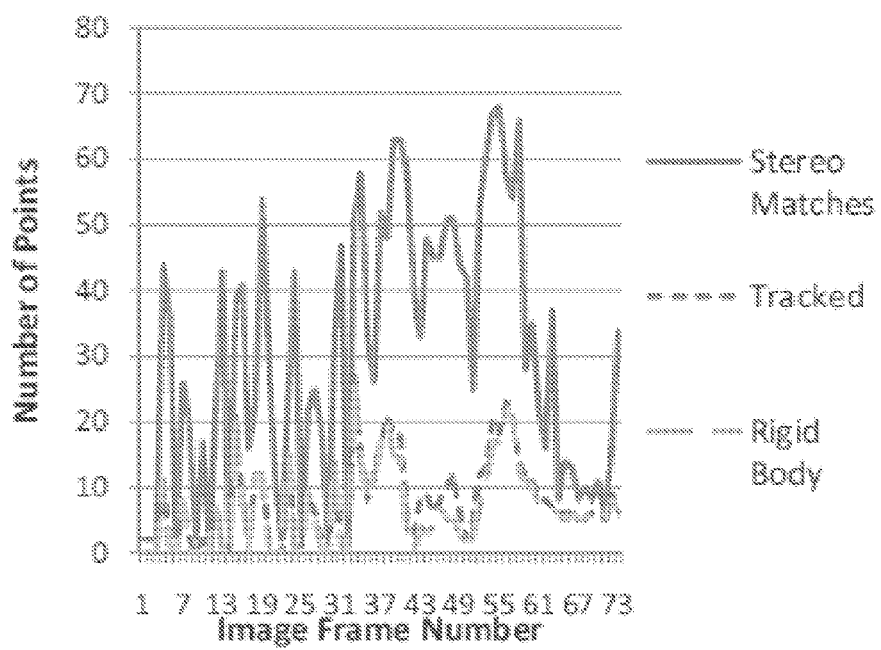
FIG. 11 shows an x-y plot of the number of points extracted during processing of live mouse images using stereo matching, tracking of points over time, and a rigid body model in accordance with the various embodiments.

FIG. 11 shows the numbers of points obtained for stereo matched points, tracked points, and points fit to the rigid body model for each frame in the sequence. In particular, FIG. 11 shows that the number of stereo matches has a large variation from image to image while tracked and rigid body fit points are very close with small numbers of tracked points not applied to the rigid body fit.

The average number of points for each of these point sets is given in Table 1. The stereo matched points are found first and have the greatest number of points. From these matched points, tracking points are identified and are a subset of the matches. Rigid body fit points are those tracked points fitting the rigid body model with outliers omitted. While the average number of rigid body fit points is more than sufficient to calculate the transformation, in a number of images of the sequence (20), less than three points were fit so that a transformation was unable to be determined.

TABLE I

AVERAGE NUMBER OF POINTS
FOR DIFFERENT POINT SETS

| Points Set | Average number of points |
| --- | --- |
| Stereo Matches | 31.7 |
| Tracked Points | 8.2 |
| Rigid Body Fit | 7.0 |

RMS error and scale error of the transformation were also determined with the results shown in Table II. Scale error is defined as the deviation from the exact scale of one.

TABLE II

RMS ERROR AND SCALE ERROR
FOR 3D TRANSFORMATIONS

| Error Measure | Average | Standard Deviation |
| --- | --- | --- |
| RMS Error | 0.17 mm | 0.06 mm |
| Scale Error | 0.004 | 0.02 |

Again, Tables I and II demonstrate that the rigid body fit correlates very well and is confirmed to be valid for at least mouse head motion as presented. Although Table II represents error limits for a particular image sequence, the various embodiments are not limited in this regard. That is, the error limits illustrated above are not theoretical error limits of the various embodiments.

Figure 12:
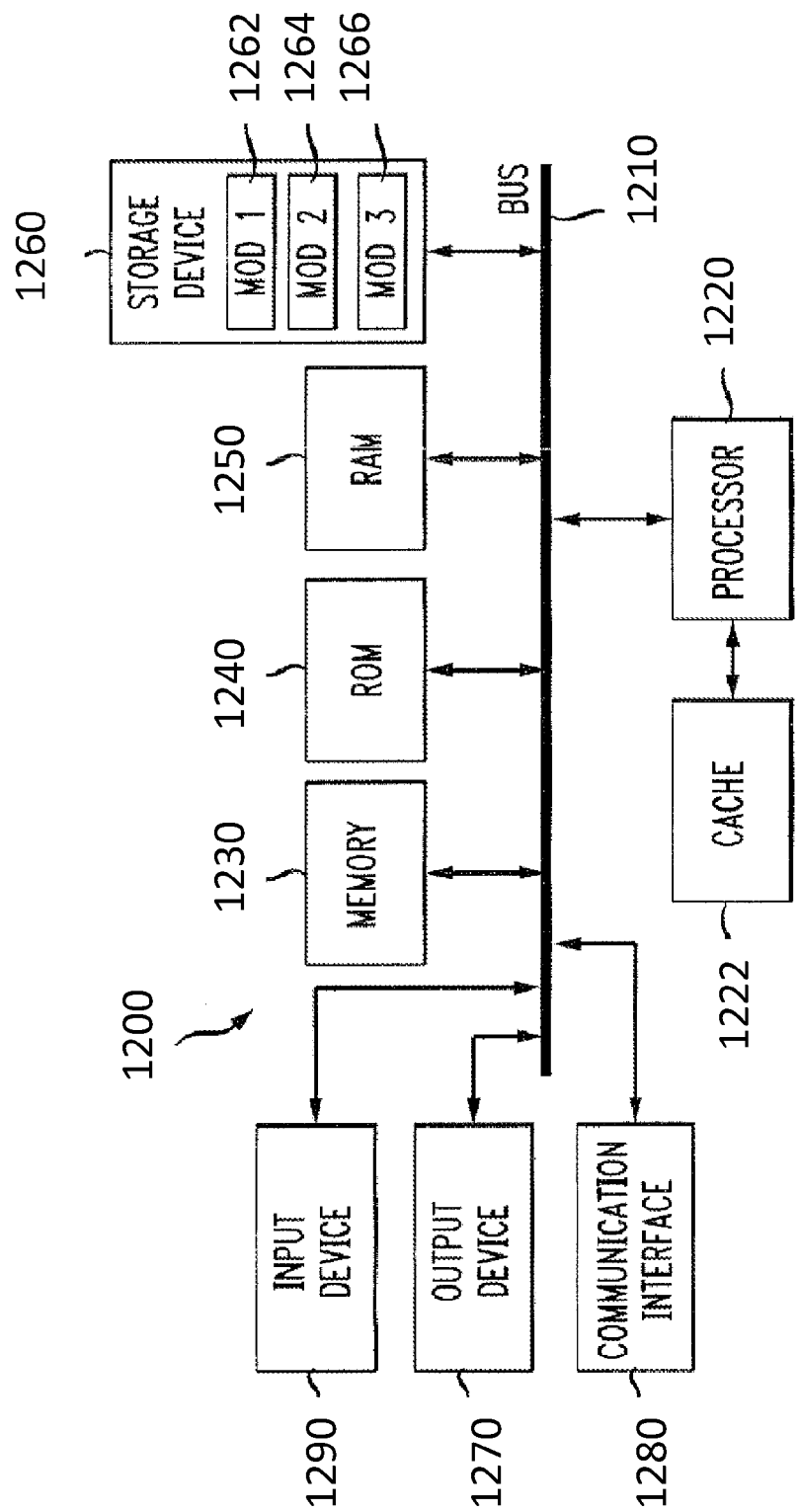
FIG. 12 shows an exemplary computer system for carrying out one or more processes and method in accordance with the various embodiments.

Turning now to FIG. 12, this is shown an exemplary system 1200 includes a general-purpose computing device 1200 for performing one or more of the various methods and processes described above. System 1200 includes a processing unit (CPU or processor) 1220 and a system bus 1210 that couples various system components including the system memory 1230 such as read only memory (ROM) 1240 and random access memory (RAM) 1250 to the processor 1220. The system 1200 can include a cache 1222 of high speed memory connected directly with, in close proximity to, or integrated as part of the processor 1220. The system 1200 copies data from the memory 1230 and/or the storage device 1260 to the cache 1222 for quick access by the processor 1220. In this way, the cache 1222 provides a performance boost that avoids processor 1220 delays while waiting for data. These and other modules can be configured to control the processor 1220 to perform various actions. Other system memory 1230 may be available for use as well. The memory 1230 can include multiple different types of memory with different performance characteristics. It can be appreciated that the disclosure may operate on a computing device 1200 with more than one processor 1220 or on a group or cluster of computing devices networked together to provide greater processing capability. The processor 1220 can include any general purpose processor and a hardware module or software module, such as module 1 1262, module 2 1264, and module 3 1266 stored in storage device 1260, configured to control the processor 1220 as well as a special-purpose processor where software instructions are incorporated into the actual processor design. The processor 1220 may essentially be a completely self-contained computing system, containing multiple cores or processors, a bus, memory controller, cache, etc. A multi-core processor may be symmetric or asymmetric.

The system bus 1210 may be any of several types of bus structures including a memory bus or memory controller, a peripheral bus, and a local bus using any of a variety of bus architectures. A basic input/output (BIOS) stored in ROM 1240 or the like, may provide the basic routine that helps to transfer information between elements within the computing device 1200, such as during start-up. The computing device 1200 further includes storage devices 1260 such as a hard disk drive, a magnetic disk drive, an optical disk drive, tape drive or the like. The storage device 1260 can include software modules 1262, 1264, 1266 for controlling the processor 1220. Other hardware or software modules are contemplated. The storage device 1260 is connected to the system bus 1210 by a drive interface. The drives and the associated computer readable storage media provide nonvolatile storage of computer readable instructions, data structures, program modules and other data for the computing device 1200. In one aspect, a hardware module that performs a particular function includes the software component stored in a tangible and/or intangible computer-readable medium in connection with the necessary hardware components, such as the processor 1220, bus 1210, display 1270, and so forth, to carry out the function. The basic components are known to those of skill in the art and appropriate variations are contemplated depending on the type of device, such as whether the device 1200 is a small, handheld computing device, a desktop computer, or a computer server.

Although the exemplary embodiment described herein employs the hard disk 1260, it should be appreciated by those skilled in the art that other types of computer readable media which can store data that are accessible by a computer, such as magnetic cassettes, flash memory cards, digital versatile disks, cartridges, random access memories (RAMs) 1250, read only memory (ROM) 1240, a cable or wireless signal containing a bit stream and the like, may also be used in the exemplary operating environment. Tangible, non-transitory computer-readable storage media expressly exclude media such as energy, carrier signals, electromagnetic waves, and signals per se.

To enable user interaction with the computing device 1200, an input device 1290 represents any number of input mechanisms, such as a microphone for speech, a touch-sensitive screen for gesture or graphical input, keyboard, mouse, motion input, speech and so forth. An output device 1270 can also be one or more of a number of output mechanisms known to those of skill in the art. In some instances, multimodal systems enable a user to provide multiple types of input to communicate with the computing device 1200. The communications interface 1280 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 1220. The functions these blocks represent may be provided through the use of either shared or dedicated hardware, including, but not limited to, hardware capable of executing software and hardware, such as a processor 1220, that is purpose-built to operate as an equivalent to software executing on a general purpose processor. For example the functions of one or more processors presented in FIG. 12 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 1240 for storing software performing the operations discussed below, and random access memory (RAM) 1250 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 1200 shown in FIG. 12 can practice all or part of the recited methods, can be a part of the recited systems, and/or can operate according to instructions in the recited tangible computer-readable storage media. Such logical operations can be implemented as modules configured to control the processor 1220 to perform particular functions according to the programming of the module. For example, FIG. 12 illustrates three modules Mod1 1262, Mod2 1264 and Mod3 1266 which are modules configured to control the processor 1220. These modules may be stored on the storage device 1260 and loaded into RAM 1250 or memory 1230 at runtime or may be stored as would be known in the art in other computer-readable memory locations.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method for generating pose information for motion correcting images, comprising the steps of:
    obtaining a first plurality of images of a region of interest (ROI) to be imaged acquired using a pair of cameras located at different positions and orientations with respect to the ROI, the first plurality of images associated with a first time and define one or more stereo image pairs of the ROI;
    defining active regions in each of the first plurality of images,
    selecting intrinsic features in each of the first plurality of images based on the corresponding ones of the active regions,
    identifying a portion of the intrinsic features temporally and spatially matching intrinsic features in corresponding ones of a second plurality of images of the ROI associated with a second time prior to the first time,
    calculating three-dimensional (3D) coordinates for the portion of the intrinsic features based on an optical triangulation using the stereo image pairs, the optical triangulation based at least on image coordinates for each of the pair of cameras, image disparity associated with the stereo image pairs, and a physical configuration of the pair of cameras; and
    computing a relative pose of the ROI in 3D space for the first plurality of images based on the 3D coordinates for the portion of the intrinsic features.

2. The method of claim 1, wherein the step of obtaining comprises:
    rectifying a plurality of raw images acquired using a plurality of cameras at the different positions to a canonical arrangement based on calibration parameters for the plurality of cameras to yield the first plurality of images.

3. The method of claim 2, wherein the step of obtaining further comprises:
    prior to the rectifying, adjusting image attributes for the plurality of raw images.

4. The method of claim 2, wherein the rectifying comprises:
    applying an image rectification transform to each of the plurality of raw images based on the calibration parameters to yield a plurality of rectified images that lie in a same plane, have a same focal length, and have a same orientation.

5. The method of claim 2, wherein the rectifying comprises:
    applying an image rectification transform to the plurality of raw images based on the calibration parameters to yield a plurality of rectified images so that each of the intrinsic features in the plurality of images lies along at least one of a common horizontal line and a common vertical line.

6. The method of claim 1, wherein the defining the active region further comprises:
selecting as the active regions visible portions of the ROI extracted from the first plurality of images.

7. The method of claim 1, wherein the selecting the intrinsic features further comprises:
selecting as the intrinsic features a portion of discrete features extracted from the one of the first plurality of images located in the active region.

8. A system for generating pose information for motion correcting images, comprising:
a processor;
a non-transitory computer-readable storage medium storing a computer program for causing the processor to perform operations comprising:
obtaining a first plurality of images of a region of interest (ROI) to be imaged acquired using a pair of cameras located at different positions and orientations with respect to the ROI, the first plurality of images associated with a first time and define one or more stereo image pairs;
defining active regions in each of the first plurality of images,
selecting intrinsic features in each of the first plurality of images based on the corresponding ones of the active regions,
identifying a portion of the intrinsic features temporally and spatially matching intrinsic features in corresponding ones of a second plurality of images of the ROI associated with a second time prior to the first time,
calculating three-dimensional (3D) coordinates for the portion of the intrinsic features based on an optical triangulation using the stereo image pairs, the optical triangulation based at least on image coordinates for each of the pair of cameras, image disparity associated with the stereo image pairs, and a physical configuration of the pair of cameras, and
computing a relative pose of the ROI in 3D space for the first plurality of images based on the 3D coordinates for the portion of the intrinsic features.

9. The system of claim 8, wherein the obtaining further comprising rectifying a plurality of raw images acquired using a plurality of cameras at the different positions to a canonical arrangement based on calibration parameters for the plurality of cameras to yield the first plurality of images.

10. The system of claim 9, wherein the obtaining further comprises adjusting image attributes for the plurality of raw images prior to the rectifying.

11. The system of claim 9, wherein rectifying the plurality of raw images comprises:
applying an image rectification transform to each of the plurality of raw images based on the calibration parameters to yield a plurality of rectified images that lie in a same plane, have a same focal length, and have a same orientation.

12. The system of claim 9, wherein the rectifying the plurality of raw images comprises:
applying an image rectification transform to each of the plurality of raw images based on the calibration parameters to yield a plurality of rectified images.

13. The system of claim 8, wherein the active regions are defined by selecting as the active regions visible portions of the ROI extracted from the first plurality of images.

14. The system of claim 8, wherein the intrinsic features are selected by selecting as the intrinsic features a portion of discrete features extracted from the one of the first plurality of images located in the active region.

15. A non-transitory computer-readable medium storing a computer program having instructions for generating pose information for motion correcting images, the instructions comprising:
obtaining a first plurality of images of a region of interest (ROI) to be tomographically imaged and associated with a first time, the first plurality of images acquired via a pair of cameras located at with different positions and orientations with respect to the ROI and define one or more stereo image pairs;
processing each one of the first plurality of images, the processing comprising:
defining an active region in the one of the first plurality of images,
selecting intrinsic features in the one of the first plurality of images based on the active region,
identifying a portion of the intrinsic features temporally and spatially matching intrinsic features in a corresponding one of a second plurality of images of the ROI associated with a second time prior to the first time, and
computing three-dimensional (3D) coordinates for the portion of the intrinsic features based on an optical triangulation using the stereo image pairs, the optical triangulation based at least on image coordinates for each of the pair of cameras, image disparity associated with the stereo image pairs, and a physical configuration of the pair of cameras; and
computing a relative pose of the ROI in 3D space for the first plurality of images based on the 3D coordinates for the portion of the intrinsic features.

16. The non-transitory computer-readable medium of claim 15, wherein the obtaining comprises:
adjusting image attributes for a plurality of raw images of the ROI acquired using a plurality of cameras at the different positions; and
rectifying the plurality of raw images to a canonical arrangement based on calibration parameters for the plurality of cameras to yield the first plurality of images.

17. The non-transitory computer-readable medium of claim 16, wherein the rectifying comprises:
applying an image rectification transform to each of the plurality of raw images based on the calibration parameters to yield a plurality of rectified images that lie in a same plane, have a same focal length, and have a same orientation.

18. The non-transitory computer-readable medium of claim 16, wherein the rectifying comprises:
applying an image rectification transform to the plurality of raw images based on the calibration parameters to yield a plurality of rectified images so that each of the intrinsic features in the plurality of images lies along at least one of a common horizontal line and a common vertical line.

19. The non-transitory computer-readable medium of claim 15, wherein the defining the active region further comprises:
selecting as an outline of the active region a visible portion of the ROI extracted from the one of the first plurality images.

20. The non-transitory computer-readable medium of claim 15, wherein the selecting the intrinsic features further comprises:

selecting as the intrinsic features a portion of discrete features extracted from the one of the first plurality of images located in the active region.

* * * * *